US012217040B2

(12) United States Patent
Goto

(10) Patent No.: US 12,217,040 B2
(45) Date of Patent: Feb. 4, 2025

(54) ELECTRONIC CONTROL UNIT, SOFTWARE UPDATE METHOD, SOFTWARE UPDATE PROGRAM PRODUCT AND ELECTRONIC CONTROL SYSTEM

(71) Applicant: DENSO CORPORATION, Kariya (JP)

(72) Inventor: Fumihide Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 17/534,491

(22) Filed: Nov. 24, 2021

(65) Prior Publication Data

US 2022/0171613 A1 Jun. 2, 2022

(30) Foreign Application Priority Data

Nov. 27, 2020 (JP) ................................. 2020-197110
Oct. 29, 2021 (JP) ................................. 2021-178075

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45579* (2013.01); *G06F 2009/45595* (2013.01)

(58) Field of Classification Search
CPC ........................................................ G06F 8/65
See application file for complete search history.

(56) References Cited

U.S. PATENT DOCUMENTS 9,021,465 B2 * 4/2015 Laor ..................... G06F 9/4555
717/138
2008/0299909 A1 * 12/2008 Sakai ..................... H04L 41/12
455/66.1

(Continued)

FOREIGN PATENT DOCUMENTS

JP 2017-87773 A 5/2017
JP 2020027668 A 2/2020

(Continued)

OTHER PUBLICATIONS

Explanation of Adaptive Platform Design, Autosar AP-R19-11, Document ID 706, pp. 1-84.

(Continued)

*Primary Examiner* — Jae U Jeon
(74) *Attorney, Agent, or Firm* — Harness, Dickey & Pierce, P.L.C.

(57) ABSTRACT

An electronic control unit having a first virtual machine includes a file acquisition portion that acquires a file to update software and an update management portion. The update management portion includes: a determination portion that determines whether communication is possible; between the update management portion and a first update portion that updates software of the first virtual machine; and/or between the update management portion and a second update portion that updates software of a second virtual machine connected to the first virtual machine; an acceptance portion that accepts the file from the file acquisition portion; and an update instruction portion that instructs one or more of the first update portion and the second update portion, which are determined by the determination portion to be capable of communicating, to perform a software update using the file accepted by the acceptance portion.

11 Claims, 9 Drawing Sheets

(56) References Cited

U.S. PATENT DOCUMENTS

| | | | | |
|---|---|---|---|---|
| 2010/0027414 | A1* | 2/2010 | Hamachi | H04W 48/16 370/216 |
| 2010/0198871 | A1* | 8/2010 | Stiegler | G06F 16/1767 709/206 |
| 2011/0058500 | A1* | 3/2011 | Nagasaki | H04W 8/183 370/254 |
| 2011/0285860 | A1* | 11/2011 | Huang | H04N 23/62 348/207.1 |
| 2014/0068597 | A1* | 3/2014 | Hirahara | G06F 8/654 717/173 |
| 2014/0358934 | A1* | 12/2014 | Hirose | G06F 16/285 707/741 |
| 2018/0039489 | A1* | 2/2018 | Shiraishi | G06F 11/3055 |
| 2018/0203622 | A1 | 7/2018 | Ishiguro | |
| 2018/0293067 | A1* | 10/2018 | Hirshberg | G06F 8/656 |
| 2019/0317749 | A1* | 10/2019 | Hu | G06F 8/65 |
| 2020/0204519 | A1* | 6/2020 | Isaev | H04L 63/029 |
| 2020/0249930 | A1 | 8/2020 | Abe | |
| 2021/0165585 | A1 | 6/2021 | Harata et al. | |

FOREIGN PATENT DOCUMENTS

| | | | |
|---|---|---|---|
| JP | 2020-123253 | A | 8/2020 |
| JP | 2020-173561 | A | 10/2020 |

OTHER PUBLICATIONS

Requirements on Update and Configuration Management; Autosar AP-R19-11, Document ID 887, pp. 1-26.

Specification of Update and Configuration Management, Autosar AP-R19-11, Document ID 888, pp. 1-122.

Osaka NDS Embedded Linux Cross Online Forum #11, Jul. 10, 2020, BlackBerry Japan, Kazunori Inami, pp. 1-16.

U.S. Appl. No. 17/534,488, filed Nov. 24, 2021, Fumihide Goto.

U.S. Appl. No. 17/534,490, filed Nov. 24, 2021, Fumihide Goto.

* cited by examiner

ELECTRONIC CONTROL UNIT, SOFTWARE UPDATE METHOD, SOFTWARE UPDATE PROGRAM PRODUCT AND ELECTRONIC CONTROL SYSTEM

CROSS REFERENCE TO RELATED APPLICATIONS

The present application claims the benefit of priority from Japanese Patent Applications No. 2020-197110 filed on Nov. 27, 2020 and No. 2021-178075 filed on Oct. 29, 2021. The entire disclosures of the above application are incorporated herein by reference.

TECHNICAL FIELD

The present disclosure relates to an electronic control unit, and more specifically, to an electronic control unit for a vehicle, a method performed by the electronic control unit, a program product executable on the electronic control unit, and an electronic control system having the electronic control unit.

BACKGROUND

Automobiles are equipped with various electronic control units connected by an in-vehicle network. The functions required of automobiles are increasingly complicated with the development of automatic operation technologies in recent years. The number of electronic control units mounted on automobiles is increasing. Therefore, it is proposed to apply a virtualization technology that can suppress the total number of electronic control units by integrating multiple functions into one electronic control unit.

For example, there has been known in an in-vehicle computer, a virtualized operating system such as a hypervisor is used to configure multiple virtual ECUs. Such technology can efficiently use physical resources by integrating the physical resources required for operations of terminal devices into the in-vehicle computer when the terminal devices are connected to the in-vehicle computer via the ECU.

SUMMARY

An electronic control unit according to one aspect of the present disclosure is an electronic control unit including: a first virtual machine; a file acquisition portion that is configured to acquire a file to update software from an outside of the electronic control unit; and an update management portion that is configured to manage updates of the software. The update management portion includes: a determination portion that is configured to determine whether communication is possible; between the update management portion and a first update portion that is configured to update software of the first virtual machine; and/or between the update management portion and a second update portion that is configured to update software of a second virtual machine connected to the first virtual machine; an acceptance portion that is configured to accept the file from the file acquisition portion; and an update instruction portion that is configured to instruct one or more of the first update portion and the second update portion, which are determined by the determination portion to be capable of communicating, to perform a software update using the file accepted by the acceptance portion.

DETAILED DESCRIPTION

Figure 1:
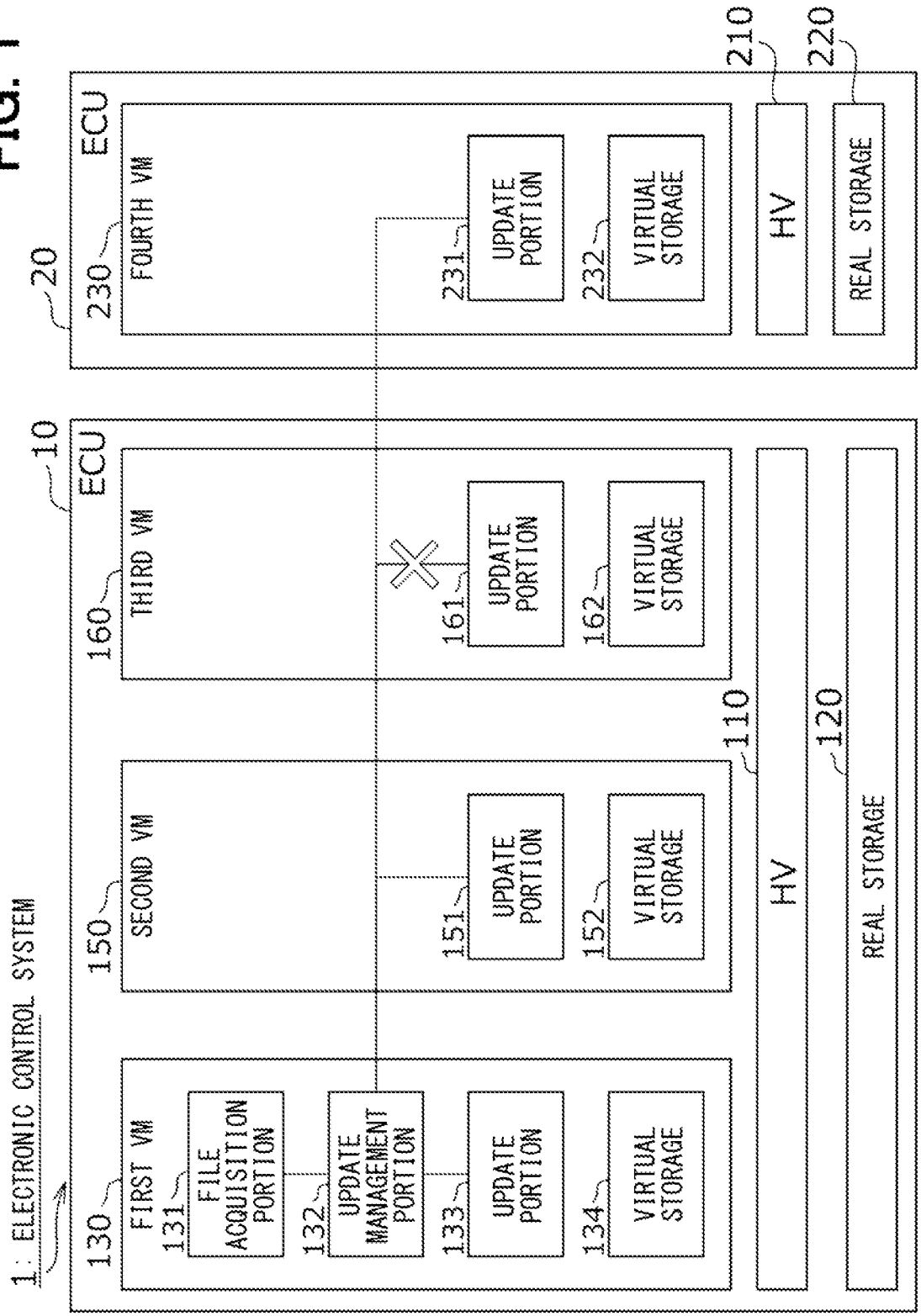
FIG. 1 is a diagram illustrating an electronic control unit according to first through third embodiments, and an electronic control system including the electronic control unit.

To begin with, a relevant technology will be described first only for understanding the following embodiments. The inventors found the following problem.

Electronic control units are virtualized to provide virtual machines some of which control vehicle operations such as traveling and steering. It is advisable to constantly update the software to the latest version to ensure vehicle safety. Therefore, each virtual machine includes the function to update the virtual machine software. However, there may be unsuccessful communication between the update function and an update management function of managing software updates on multiple virtual machines, disabling the update on some virtual machines. In such a case, the update management function may determine that an entire update process malfunctions, and may retry the entire update process on an in-vehicle system or the electronic control unit. Consequently, it takes time to complete the update process, and unnecessary resources are consumed.

It is one objective of the present disclosure to prevent an overall update process from being determined to malfunction and prevent an increase in the time required for the update process and the consumption of resources even if an update function cannot communicate with the update management function.

As described above, an electronic control unit according to the one aspect of the present disclosure is an electronic control unit including: a first virtual machine; a file acquisition portion that is configured to acquire a file to update software from an outside of the electronic control unit; and an update management portion that is configured to manage updates of the software. The update management portion includes: a determination portion that is configured to determine whether communication is possible; between the update management portion and a first update portion that is configured to update software of the first virtual machine; and/or between the update management portion and a second update portion that is configured to update software of a second virtual machine connected to the first virtual machine; an acceptance portion that is configured to accept the file from the file acquisition portion; and an update instruction portion that is configured to instruct one or more of the first update portion and the second update portion, which are determined by the determination portion to be capable of communicating, a software update using the file accepted by the acceptance portion.

A software update method according to another aspect of the present disclosure is a software update method performed on an electronic control unit including: a first virtual machine; a file acquisition portion that is configured to acquire a file to update software from an outside of the electronic control unit; and an update management portion that is configured to manage updates of the software. The method includes: determining whether communication is possible; between the update management portion and a first update portion that is configured to update software of the first virtual machine; and/or between the update management portion and a second update portion that is configured to update software of a second virtual machine connected to the first virtual machine accepting the file from file acquisition portion; and instructing one or more of the first update portion and the second update portion, which are determined to be capable of communicating, to perform a software update using the file accepted from the file acquisition portion.

A software update program according to yet another aspect of the present disclosure is a software update program executable on an electronic control unit including: a first virtual machine; a file acquisition portion that is configured to acquire a file to update software from an outside of the electronic control unit; and an update management portion that is configured to manage updates of the software. The program includes instructions of: determining whether communication is possible; between the update management portion and a first update portion that is configured to update software of the first virtual machine; and/or between the update management portion and a second update portion that is configured to update software of a second virtual machine connected to the first virtual machine; accepting the file from file acquisition portion; and instructing one or more of the first update portion and the second update portion, which are determined to be capable of communicating, to perform a software update using the file accepted from the file acquisition portion.

An electronic control system according to yet another aspect of the present disclosure is an electronic control system including: a first electronic control unit having a first virtual machine; and a second electronic control unit having a second virtual machine. The first virtual machine includes: a file acquisition portion that is configured to acquire a file to update software from an outside of the first electronic control unit; and an update management portion that is configured to manage updates of the software; the update management portion includes: a determination portion that is configured to determine whether communication is possible between the update management portion and a second update portion that is configured to update software of the second virtual machine; an acceptance portion that is configured to accept the file from the file acquisition portion; and an update instruction portion that is configured to instruct the second update portion that is capable of communicating with the update management portion to update software using the file accepted by the acceptance portion, and the second update portion of the second virtual machine is configured to update software of the second virtual machine using the file as instructed by the update instruction portion.

The electronic control unit, the software update method, the software update program product, and the electronic control system according to the present disclosure enable the update portion capable of communication to update the software of virtual machines even if the electronic control unit or the electronic control system includes an update portion incapable of communication with the update management portion.

Hereinafter, the description below explains embodiments of the present disclosure by reference to the drawings.

The present invention signifies the invention described in the appended claims or the solution to the problem and is not limited to the following embodiments. At least, the quoted words signify those described in the claims or the solution to the problem and are also not limited to the following embodiments.

The configurations and methods described in the dependent claims signify unspecified configurations and methods in the invention described in the independent claims. The configurations and methods of the embodiments corresponding to the configurations and methods described in the dependent claims, and the configurations and methods described only in the embodiments and not described in the claims signify unspecified configurations and methods in the present invention. When the description of a claim is wider than the description of an embodiment, the configurations and methods described in the embodiment also signify unspecified configurations and methods in the present invention in the sense that the configurations and methods described in the embodiments also provide examples of the configurations and methods of the present invention. In any of these cases, a configuration and a method, when described in an independent claim, are indispensable to the present invention.

An effect described in the embodiment applies when the embodiment provides an example of the present invention. The effect is not necessarily intrinsic to the present invention.

When multiple embodiments are available, the configuration disclosed in each embodiment is not limited to that embodiment but can be combined across the embodiments. For example, the configuration disclosed in one embodiment may be combined with another embodiment. Configurations disclosed in the embodiments may be collected and combined.

1. First Embodiment

The description below explains the electronic control unit according to the first embodiment and the electronic control system including the electronic control unit by reference to FIG. 1. The electronic control unit and the electronic control system according to the embodiments are assumed to be an in-vehicle device and an in-vehicle system "mounted" on a vehicle as a "moving body," but are not limited thereto.

The "moving body" signifies an object capable of moving and moving speeds are unspecified. Undoubtedly, the moving body may or may not stop. For example, the moving bodies include, but are not limited to automobiles, motorcycles, bicycles, pedestrians, ships, aircraft, and objects mounted on them.

Being "mounted" includes a state of being directly fastened to the moving body and a state of being moved with the moving body though not being directly fastened to the same. For example, the state of being mounted includes a case where a person riding the moving body carries a targeted object or the targeted object is mounted on a cargo placed on the moving body.

An electronic control system 1 includes multiple "electronic control units" (ECUs). As illustrated in FIG. 1, the electronic control system 1 includes two ECUs (ECU 10 and ECU 20) but may include any number of ECUs. The ECU 10 and the ECU 20 are connected via an in-vehicle network such as CAN (Controller Area Network) or LIN (Local Interconnect Network), Ethernet (registered trademark), or a wireless communication network, for example.

For example, the "electronic control unit" is mainly composed of semiconductor devices and may be configured as a so-called information processing device including a CPU (Central Processing Unit) and a volatile storage portion such as RAM (Random Access Memory). The information processing device may further include a non-volatile storage portion such as flash memory and a network interface portion connected to a communication network, for example. Further, the information processing device may be configured as a packaged semiconductor device (element) or a set of semiconductor devices wired on a wiring board.

The ECU 10 is based on a platform called Adaptive Platform (AP) capable of dynamically expanding functions in AUTOSAR (AUTomotive Open System ARchitecture), for example. The AP is mainly suited to ECUs for automatic operations. The ECU 20 is based on a platform called Classic Platform (CP) optimizing static functions in AUTOSAR. The CP is mainly appropriate for vehicle control ECUs.

Each of the ECU 10 and the ECU 20 configuring the electronic control system 1 includes at least one virtual machine managed by a hypervisor. The description below explains the configurations of the ECU 10, the ECU 20 and the virtual machine installed in each ECU. In the drawings, the virtual machine is abbreviated as VM.

(1) ECU 10

The ECU 10 includes a hypervisor (HV) 110, multiple virtual machines (VMs) (130, 150, 160) managed by the hypervisor, and a real storage 120 as hardware.

The hypervisor 110 is software that virtualizes ECU 10. According to the example in FIG. 1, the first virtual machine 130 through the third virtual machine 160 are built on the hypervisor 110. The virtual machines built on the hypervisor 114 are virtually "connected" to each other.

The "connection" to virtual machines signifies data exchangeability between the virtual machines. The connection includes not only the virtual connection of virtual machines implemented on the same hardware but also a networked connection between virtual machines implemented on different hardware, for example. The data exchangeability does not necessarily signify the state where data can be practically exchanged. For example, there may be a state of data exchangeability even if one of the virtual machines temporarily stops or enters a sleep state due to some malfunction.

The real storage 120 is hardware memory and is available as volatile memory such as SRAM or DRAM, ROM, flash memory, or non-volatile memory such as a hard disk. The virtual storages for the first virtual machine 130 to the third virtual machine 160 (to be described) are implemented by virtualizing a storage area of the real storage 120. Although FIG. 1 illustrates one real storage 120, the real storage 120 may be composed of multiple storages.

The real storage 120 stores update files split by a parsing portion 138 to be described later. Update files may be stored in a storage area shared by multiple virtual machines or a virtual storage area implemented by virtualizing the real storage 120.

(i) First Virtual Machine 130

The first virtual machine 130 managed by the hypervisor 110 includes a file acquisition portion 131, an update management portion 132, an update portion 133, and a virtual storage 134.

The file acquisition portion 131 acquires a file from a server provided outside the ECU 10 by using OTA (Over The Air) or wired communication. The files acquired by the file acquisition portion 131 include an update file to update the virtual machine software. The files may include an update file group containing multiple update files to update multiple virtual machines, for example. The file may also contain information that identifies a virtual machine targeted at the software update. The file acquisition portion 131 is also referred to as an OTA client. The update file to update the virtual machine software may update not only the software to implement virtual machines but also an application or software mounted on the virtual machine.

When acquiring the file from the server, the file acquisition portion 131 instructs the update management portion 132 (to be described) to transmit a communication situation between the update management portion 132 and the update portion that updates virtual machines. Hereinafter, the instruction to transmit the communication situation from file acquisition portion 131 to the update management portion 132 is referred to as a communication situation request. The communication situation request may indirectly instruct the transmission of a communication situation by instructing the software update for virtual machines. A determination result notification portion 136 of the update management portion 132 notifies a determination result concerning the communication situation in response to the communication situation request. Based on the determination result, the file acquisition portion 131 selects a file to be transferred to the update management portion 132 out of the files acquired from the server and transfers the selected file to the update management portion 132. The determination result transmitted from the update management portion 132 contains information that identifies an update portion capable of communication with the update management portion 132. To the update management portion 132, the file acquisition portion 131 transfers only the file that is required for the update portion capable of communication with the update management portion 132 to update the virtual machine software. According to the present embodiment, the file acquisition portion 131 selects and transfers a file used for the update portion capable of communication with the update management portion 132 to update the virtual machine software.

According to the example in FIG. 1, the update management portion 132 can communicate with the update portion 133 of the first virtual machine 130, the update portion 151 of the second virtual machine, and the update portion 231 of the fourth virtual machine 230 and cannot communicate with the update portion 161 of the third virtual machine 160. Therefore, the file acquisition portion 131 transfers, to the update management portion 132, only the files needed to update the software for the first virtual machine 130, the second virtual machine 150, and the fourth virtual machine 230.

Figure 2:
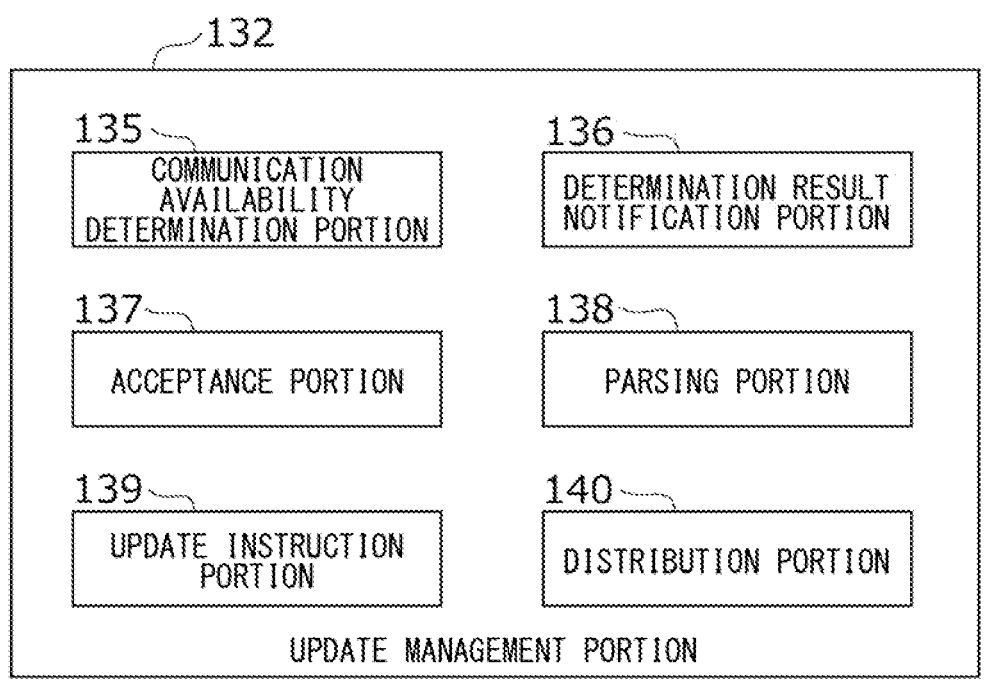
FIG. 2 is a diagram illustrating functions of an update management portion according to the first and second embodiments.

The update management portion 132 manages software updates for the first virtual machine 130 and virtual machines connected to the first virtual machine 130. FIG. 2 illustrates functions implemented by the update management portion 132. The update management portion 132 implements a communication availability determination portion 135, a determination result notification portion 136, an acceptance portion 137, a parsing portion 138, an update instruction portion 139, and a distribution portion 140. The update management portion 132 executes all or part of the function called a UCM (Update and Configuration Management) master in AUTOSAR, for example.

The communication availability determination portion 135 (comparable to "determination portion") determines whether a communication is possible between the update management portion 132 and the update portion to update the software for each virtual machine. For example, the communication availability determination portion 135 transmits a search signal to each update portion. When a response signal is received from the update portion as the destination, the communication capability determination portion 135 determines that communication with the update portion is possible. The communication availability determination portion 135 may determine the possibility of the communication by using a function called Service Discovery that searches for available services and establishes communication.

The communication availability determination portion 135 transmits a search signal to each update portion at the timing when a communication situation request is received from the file acquisition portion 131, for example. In this case, the communication availability determination portion 135 can determine the latest communication availability situation between the update management portion 132 and the update portion of each virtual machine. However, the communication availability determination portion 135 may determine whether communication with the update portion is possible by periodically transmitting a search signal to each update portion in addition to, or in place of the timing when a communication situation request is received. The communication availability determination portion 135 may further transmit a search signal at the timing when the ECU 10 boots up. A determination result from the communication availability determination portion 135 is recorded in the real storage 120.

According to the example in FIG. 1 an abnormality occurs on the communication network between the update management portion 132 and the update portion 161. The search signal transmitted by the communication availability determination portion 135 does not reach the update portion 161. Consequently, the communication availability determination portion 135 determines that communication with the update portion 161 is impossible because no response signal can be received from the update portion 161. Meanwhile, the search signal transmitted by the communication availability determination portion 135 reaches the update portions 133, 151, and 231. These update portions can transmit a response signal to the communication availability determination portion 135. Upon receiving the response signal, the communication availability determination portion 135 determines that communication between the update management portion 132 and any of the update portions 133, 151, and 231 is possible.

The determination result notification portion 136 (comparable to "notification portion") notifies the file acquisition portion 131 of a determination result from the communication availability determination portion 135. For example, the determination result notification portion 136 notifies the file acquisition portion 131 of at least one of information such as identification information about a virtual machine including an update portion capable of communication; identification information about a virtual machine including an update portion incapable of communication; and information indicating the number of virtual machines capable or incapable of communication, as a determination result from the communication availability determination portion 135.

The acceptance portion 137 accepts files transferred from the file acquisition portion 131. As above, the acceptance portion 137 accepts files to update the software for the first virtual machine 130, the second virtual machine 150, and the fourth virtual machine 230. No files are included to update the software for the third virtual machine 160.

The parsing portion 136 splits an update file group contained in the file received by the acceptance portion 137 into update files corresponding to the virtual machines. The parsed update files are stored in the real storage 120.

When the communication availability determination portion 135 determines that an update portion is capable of communication, the update instruction portion 139 instructs that update portion to update the virtual machine software. For example, the update instruction portion 139 instructs the update of the virtual machine software by using the update file distributed by the distribution portion 140 to be described later. Alternatively, the instruction portion 139 may issue an update instruction to access the real storage 120 and update the virtual machine software by using the update file stored in the real storage 120. The update portion can access the real storage 120, if possible, and update the virtual machine software by referencing the update file stored in the real storage 120, even if no update file is distributed.

When the communication availability determination portion 135 determines that an update portion, or the update portion 161 according to the present embodiment, is incapable of communication, the update instruction portion 139 does not instruct the update portion 161 to update the virtual machine software.

For example, suppose the update portion 133 can access the storage area of the real storage 120 that stores the update file. Then, the update portion 133 can update the software of the first virtual machine 130 by referencing the update file stored in the real storage 120. The update portion 133 can update the virtual machine software without the distribution of the update file. Therefore, the update instruction portion 139 instructs the update portion 133 to update the virtual machine software by accessing the real storage 120 and using the stored update file.

The distribution portion 140 distributes the update file parsed by the parsing portion 138 to the update portion determined to be capable of communication by the communication availability determination portion 135. According to the example of FIG. 1, the update file is distributed to the update portion 151 and the update portion 231. The distribution of the update file signifies not only transmitting the update file via the communication network but also moving the storage area for the update file to an area accessible to a particular virtual machine.

According to the following embodiment, the distribution portion 140 is configured to distribute the update file to the update portion 151 and the update portion 231. However, like the update portion 133, these update portions may be able to access the real storage 120. In this case, the update file need not necessarily be distributed to these update portions.

The update portion 133 (comparable to "first update portion") updates the software of the first virtual machine 130 based on the instruction from the update instruction portion 139. As above, the update portion 133 updates the software of the first virtual machine 130 by accessing the real storage 120 and using the update file stored in the real storage 120. When the update process is complete, the update portion 133 notifies the update management portion 132 that the update is complete. The update portion 133 and the update portions 151, 161, and 231 of the other virtual machines (to be described) perform all or part of the functions referred to as UCM subordinates in AUTOSAR, for example.

The virtual storage 134 is a storage area virtually provided for the first virtual machine 130 by virtualizing a storage area of the real storage 120. Therefore, a file saved in the virtual storage 134 is also considered a file saved in the real storage 120. The same applies to a virtual storage 152 and a virtual storage 162 described below.

(ii) Second Virtual Machine 15 and Third Virtual Machine 160

Similar to the first virtual machine 130, the second virtual machine 150 and the third virtual machine 160 are managed by the hypervisor 110. The second virtual machine 150 includes an update portion 151 and a virtual storage 152. The third virtual machine 160 includes an update portion 161 and a virtual storage 162.

The update portion 151 and the update portion 161 (comparable to "second update portion") receive a search signal, if any, from the update management portion 132 and then transmit a response signal in response to the search signal. The update portion 151 and the update portion 161 also update the virtual machine software based on the update instruction from the update instruction portion 139. When the software update process is complete, the update portion 151 and the update portion 161 notify the update management portion 132 of the first virtual machine 130 that the update is complete. However, according to the example of FIG. 1, the update portion 161 cannot receive a search signal and does not transmit a response signal. The update portion 161 does not receive an update instruction from the update instruction portion 139 and does not update the software.

The virtual storage 152 and the virtual storage 162 are storage areas virtually provided for the second virtual machine 150 and the third virtual machine 160, respectively. When the distribution portion 140 of the first virtual machine 130 distributes the update file, the update file is stored in the virtual storages 152 and 162. As above, the second virtual machine 150 and the third virtual machine 160 (comparable to "second virtual machine") are virtually connected to the first virtual machine 130.

(2) ECU 20

The ECU 20 includes a hypervisor 210, a real storage 220 as hardware, and a fourth virtual machine 230 managed by the hypervisor 210.

The ECU 10 and the ECU 20 are connected via an in-vehicle network. The first virtual machine 130 included in the ECU 10 and the fourth virtual machine 230 (comparable to "second virtual machine") included in the ECU 20 are virtually connected via the in-vehicle network.

The hypervisor 210 is software to virtualize the ECU 20. The fourth virtual machine 230 is built on the hypervisor 210.

Similar to the real storage 120 of the ECU 10, the real storage 220 is hardware memory provided as volatile memory such as SRAM and DRAM or non-volatile memory such as ROM, flash memory, or hard disk.

Similar to the second virtual machine 150 and the third virtual machine 160 described above, the fourth virtual machine 230 in the ECU 20 includes an update portion 231 and a virtual storage 232.

The update portion 231 (comparable to "second update portion") receives a search signal, if any, from the update management portion 132 and then transmits a response signal in response to the search signal. The update portion 231 further updates the software of the fourth virtual machine 230 based on the update instruction from the update instruction portion 139. When the software update process is complete, the update portion 231 notifies the update management portion 132 of the first virtual machine 130 that the update is complete.

The virtual storage 232 is a storage area virtually provided for the real storage 220. The virtual storage 232 saves an update file, if any, distributed from the distribution portion 140

(3) Operations of the Electronic Control System 1

Figure 3:
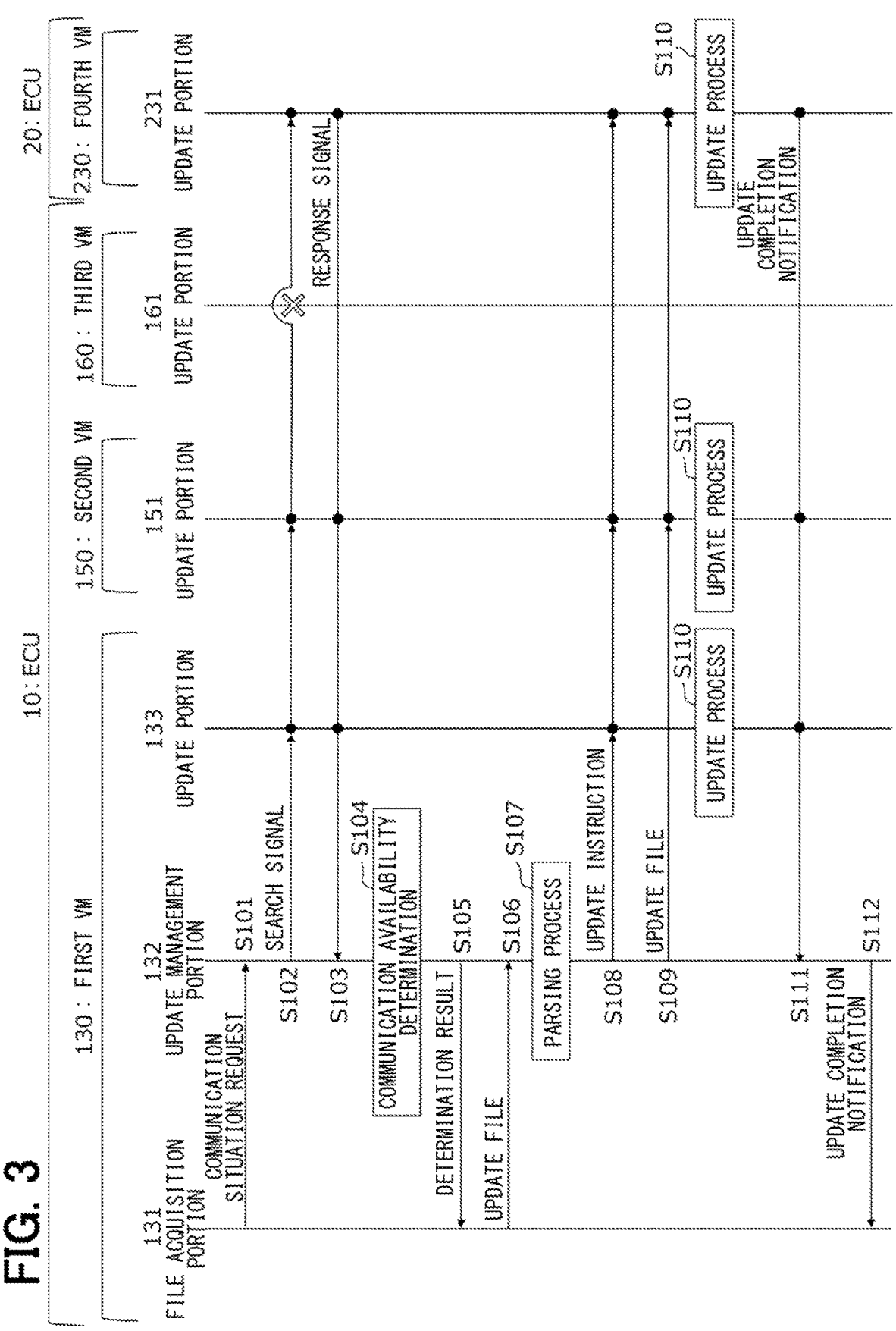
FIG. 3 is a diagram illustrating operations of the electronic control system as a whole according to the first through third embodiments.
Figure 4:
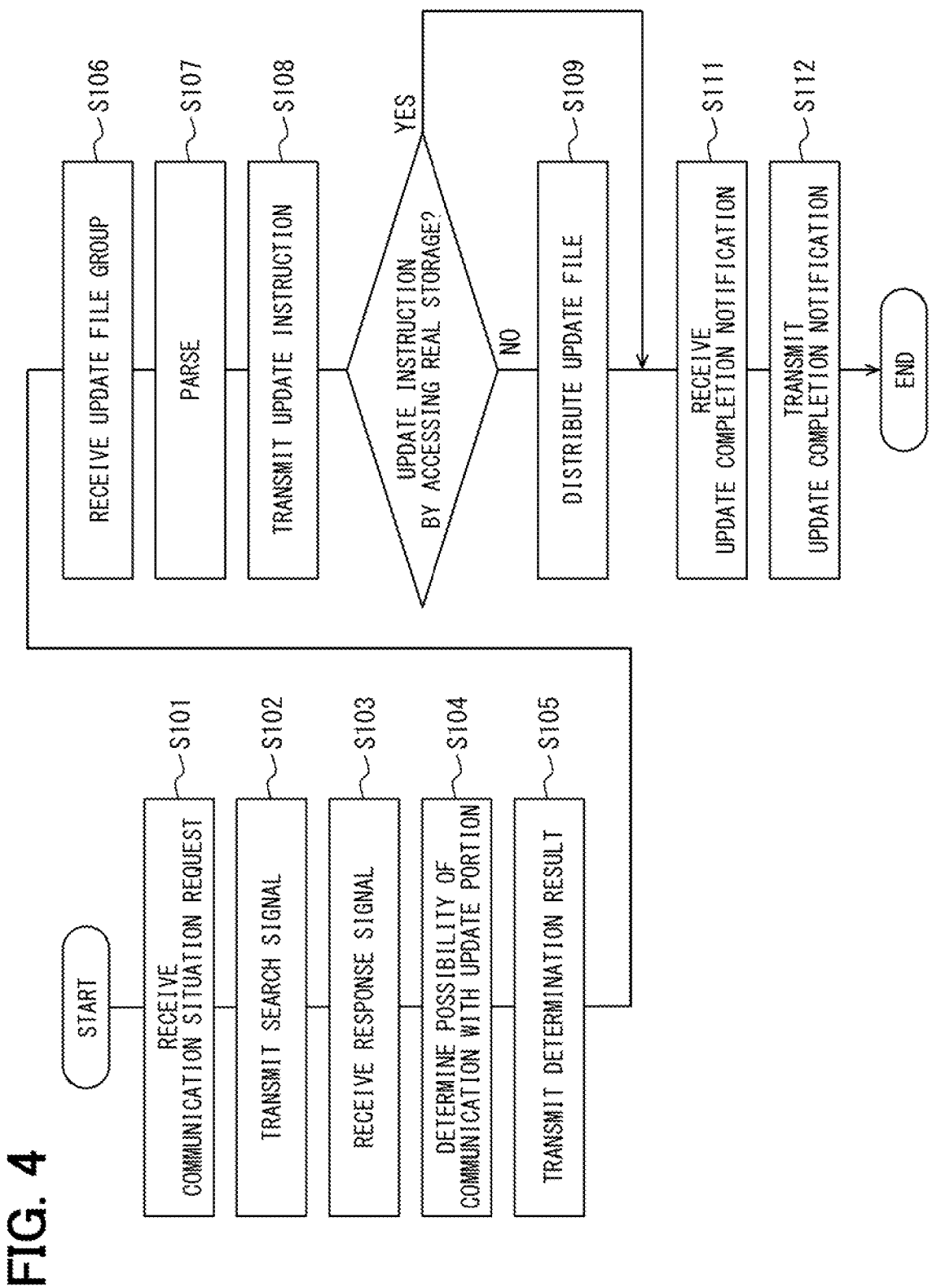
FIG. 4 is a diagram illustrating operations of the update management portion according to the first and second embodiments.
Figure 5:
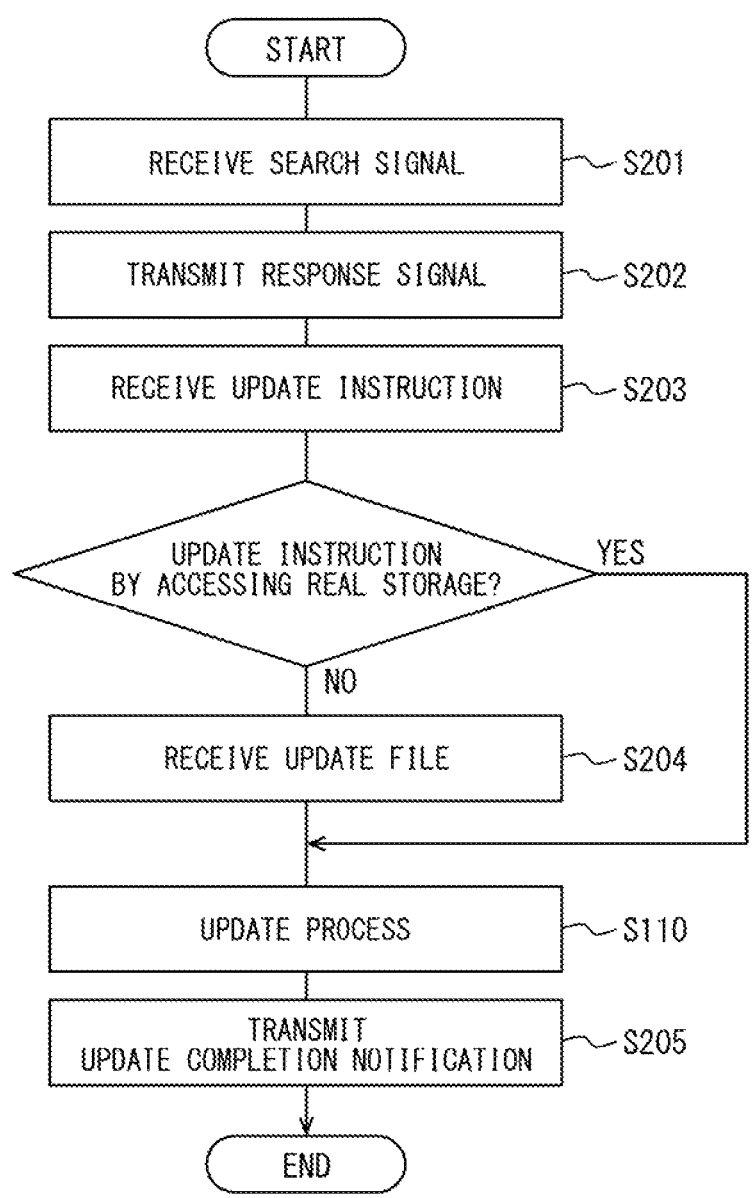
FIG. 5 is a diagram illustrating operations of an update portion according to the first and second embodiments.

The description below explains operations related to the software update for virtual machines by using FIGS. 3 through 5. FIG. 3 is a diagram illustrating operations of the electronic control system 1 as a whole. FIG. 4 illustrates operations of the update management portion 132. FIG. 5 illustrates operations of the update portion included in each virtual machine. The reference numerals used in FIG. 3 correspond to those used in FIGS. 4 and 5. The same reference numeral represents the same process.

The operations of the update management portion 132 and the update portion illustrated in FIGS. 4 and 5 are also considered the operations of the electronic control units (ECU 10 and ECU 20). The operations of each electronic control unit represent not only the software update method performed by the electronic control unit, but also a processing procedure of the software update program executable on the electronic control unit. The processes are not limited to the sequences illustrated in FIGS. 3 through 5. Namely, the sequences may be changed as long as there does not exist a restriction that forces a certain step to use the result of the preceding step, for example. The same applies to FIG. 7 to be described.

The description below mainly explains operations of the update management portion 132 by using FIGS. 3 and 4.

The update management portion 132 receives a communication situation request from the file acquisition portion 131 (FIGS. 3 and 4: S101), The communication situation request is transmitted to the update management portion 132 when the file acquisition portion 131 acquires a file to update the virtual machine software from a server outside the ECU 10.

The communication availability determination portion 135 of the update management portion 132 transmits a search signal to the update portion 133 of the first virtual machine 130 itself and the update portion of the virtual machine connected to the first virtual machine 130 (FIGS. 3 and 4: S102).

The communication availability determination portion 135 receives a response signal from the update portion of each virtual machine that receives the search signal at S102 (FIGS. 3 and 4: S103). According to the example of FIG. 3, the communication availability determination portion 135 receives a response signal from the update portion 133, the update portion 151 and the update portion 231 that receive the search signal at S102. However, the communication availability determination portion 135 receives no response signal from the update portion 161 that cannot receive the search signal at S102.

The communication availability determination portion 135 determines whether the update management portion 132 can communicate with the update portion of each virtual machine, based on the response signal received at S103 (FIGS. 3 and 4: S104). Although not shown in FIGS. 3 and 4, the determination result from the communication availability determination portion 135 may be recorded in the real storage 120 or the virtual storage 134.

The determination result notification portion 136 transmits the determination result at S104 to the file acquisition portion 131 (FIGS. 3 and 4: S105). The determination result according to the present embodiment indicates that the update management portion 132 can communicate with the update portion 133, the update portion 151, and the update portion 231.

The acceptance portion 137 accepts an update file group transmitted from the file acquisition portion 131 (FIGS. 3 and 4: S106). This update file is selected and transferred by the file acquisition portion 131 as a file for the update portion, capable of communicating with the update management portion 132, to update the software, based on the determination result transmitted at S105. Therefore, the update file group received by the acceptance portion 137 at S106 contains only the update files to update the software for the first virtual machine 130, the second virtual machine 150, and the fourth virtual machine 230.

The parsing portion 138 parses the update file group received at S106 into update files for the virtual machines (FIGS. 3 and 4: S107).

The communication availability determination portion 135 determines that the update portions 133, 151, and 231 can communicate with the update management portion 132. Therefore, the update instruction portion 139 instructs the update portions 133, 151, and 231 to update the virtual machine software (FIGS. 3 and 4: S108).

The distribution portion 140 distributes the update files separated at S107 to the update portion 151 and the update portion 231 (FIGS. 3 and 4: S109).

At S108, each update portion receives the update instruction from the update instruction portion 139 and updates the virtual machine software. The update portion 130 of the first virtual machine 130 uses the update file stored in the real storage 120 to update the software of the first virtual machine 130. The update portion 151 and the update portion 231 receive the update file distributed from the distribution portion 140 at S109 and use the received update file to update the software of the respective virtual machines (FIG. 3: S110).

The update management portion 132 receives an update completion notification, indicating completion of the update process, from the update portion of each virtual machine that has completed the update process at S110 (FIGS. 3 and 4: S111).

The update management portion 132 receives the notification, indicating completion of the update process, from the update portion of each virtual machine and then notifies the file acquisition portion 131 that the update process for each virtual machine is complete (FIGS. 3 and 4: S112).

The description below explains operations of the update portion of each virtual machine mainly by using FIG. 5.

The update portion of each virtual machine receives the search signal transmitted from the update management portion 132 at S102 (S201).

The update portion of each virtual machine having received the search signal at S201 transmits a response signal to the communication availability determination portion 135 (S202).

The update portion receives the update instruction concerning the virtual machine software from the update instruction portion 139 (S203). At S203, the update portions to receive the update instruction from the update instruction portion 139 include the update portions 133, 151, and 231 that received the search signal at S201 and transmitted the response signal at S202. If the update instruction received at S203 does not specify access to the real storage, the update portion further receives the update file transmitted from the distribution portion 140 (S204).

As mentioned by reference to FIG. 3, the update portion updates the virtual machine software based on the update instruction received at S203 (FIGS. 3 and 5: S110).

When the update process at S110 is complete, the update portion of each virtual machine notifies the update management portion 132 that the update process is complete (S205).

According to FIGS. 3 through 5, the communication availability determination portion 135 receives a communication situation request from the file acquisition portion 131 at S101 and then transmits a search signal to each update portion at S102. However, the communication availability determination portion 135 may be configured to periodically perform the process at S101 to S103, receive a communication situation request (S101) and then transmit a determination result stored in the real storage 120 (S105).

(4) Interim Overview

After the process to update the virtual machine software starts, the update management portion 132 may be found to be incapable of communicating with the update portion. In this case, the entire update process may be considered to malfunction and may be retried.

According to the present embodiment, the update management portion 132 determines the availability of the communication with the update portion before starting a series of processes related to the software update. It is possible to prevent an error from being determined to occur on the entire update process and eventually prevent the entire update process from being retried. Moreover, the transfer and separation processes are performed on only the necessary update files. It is also possible to reduce the time required for the update and suppress the use of unnecessary resources.

(5) First Modification of the First Embodiment

The first embodiment assumes that the file acquisition portion 131 passively acquires the update file group from the server outside the ECU 10. However, the file acquisition portion 131 may request the server to provide an update file needed to update the software for a particular virtual machine and acquire only the necessary update file from the server.

Before acquiring a file from the server, the file acquisition portion 131 according to the present modification transmits a communication situation request to the update management portion 132. The file acquisition portion 131 receives the determination result from the update management portion 132, and then transmits, to the server, the information indicating a virtual machine including an update portion capable of communicating with the update management portion 132. The file acquisition portion 131 may straight transfer the determination result received from the update management portion 132 to the server.

The server receives the determination result in the update management portion 132 from the file acquisition portion 131, and then transmits, to the file acquisition portion 131, only the update file to update the software for the virtual machine including an update portion capable of communicating with the update management portion 132. According to the above-described example, the server transmits, to the file acquisition portion 131, only the update files to update the software for the first virtual machine 130, the second virtual machine 150, and the fourth virtual machine 230. The file acquisition portion 131 acquires the update files from the server and then transfers the update files to the update management portion 132.

According to the present modification, the file acquisition portion 131 acquires only the required update files from the server device. It is possible to suppress the amount of communication between the file acquisition portion 131 and the server. The present modification also performs the transfer and separation processes on only the required update files. It is also possible to reduce the time required for the update and suppress the use of unnecessary resources.

(6) Second Modification of the First Embodiment

According to the first embodiment, the communication availability determination portion 135 determines whether a communication is possible between the update management portion 132 and the update portion to update the software of each virtual machine. In addition, the communication availability determination portion 135 according to the present modification also determines whether software updates are associated among the virtual machines.

The communication availability determination portion 135 determines whether software updates are "associated" among virtual machines. According to the present modification, the communication availability determination portion 135 determines whether software updates are "associated" among the third virtual machine 160 (comparable to "second virtual machine") determined to be incapable of communication, the second virtual machine 150 (comparable to "third virtual machine), and the fourth virtual machine 230 (comparable to third virtual machine"). For example, the software updates are determined to be associated when the software is conditioned to be updated at the same time to stabilize the operations of the entire system, or when operations or functions are linked among the virtual machines.

Being "associated" signifies that one update depends on the other update temporally or functionally, one update presupposes the other update, or one update and the other update are linked.

The communication availability determination portion 135 may autonomously determine a possibility of the association by examining the contents of the software to be updated. Alternatively, a predetermined format (file or packet) may be previously transmitted to the communication availability determination portion 135. For example, a package called Vehicle Package or Software Package based on the AUTOSAR specification may be used for the software update. In this case, a procedure file called a manifest included in the packages describes the information about the association among the software or machines. According to this configuration, the communication availability determination portion 135 references the association information to determine whether software updates are associated among virtual machines.

The association information may be not only described in the AUTOSAR specifications but also provided in a file format or a packet format recognizable for the communication availability determination portion 135.

According to the example of FIG. 1, suppose the fourth virtual machine 230 controls the sensor, and the third virtual machine 160 aggregates the data output from the sensor. Then, the fourth virtual machine 230 and the third virtual machine 160 are functionally linked and favorably update the software at the same time. Therefore, the communication availability determination portion 135 determines that the software updates are associated between the third virtual machine 160 (comparable to "second virtual machine") and the fourth virtual machine 230 (comparable to "third virtual machine").

The update instruction portion 139 instructs the update portion to update the virtual machine software under the condition that the communication availability determination portion 135 determines the update portion to be capable of communication. However, even if the communication availability determination portion 135 determines that the update portion is capable of communication, this update portion may be included in a virtual machine associated with the software update for the virtual machine including an update portion determined to be incapable of communication. In this case, the update portion is not instructed to update the software. According to the present modification, the update portion 231 of the fourth virtual machine 230 is determined to be capable of communicating with the update management portion 132 of the first virtual machine 130. However, the fourth virtual machine 230 is determined to be associated with the software update for the third virtual machine 160 determined to be incapable of communication. Therefore, the software update is not directed to the update portion 231 that updates the software of the fourth virtual machine 230.

It is favorable to perform the determination of the communication availability determination portion 135 before the file acquisition portion 131 receives an update file from the outside or before the acceptance portion 137 accepts an update file from the file acquisition portion 131. Then, it is possible to suppress the amount of communication between the file acquisition portion 131 and the server. Alternatively, it is possible to reduce the amount of processing on the first virtual machine 130.

The parsing portion 138 or the distribution portion 140 may split an update file and distribute separated update files based on the determination result from the communication availability determination portion 135 according to the present modification.

The present modification collectively determines whether to enable the software update on the virtual machines associated with the software update. It is possible to reduce malfunctions caused by the coexistence of virtual machines whose software may or may not be updated.

For example, collaborative operations among different virtual machines are expected to require the same version of software running on the virtual machines. In this case, it is possible to prevent malfunctions caused by compatibility problems due to the coexistence of virtual machines whose software may or may not be updated.

2. Second Embodiment

The first embodiment has described the configuration where the file acquisition portion 131 transfers, to the update management portion 132, only the update file to be transmitted to the update portion capable of communicating with the update management portion 132 based on the determination result transmitted from the update management portion 132. The present embodiment mainly describes differences from the first embodiment concerning a configuration where the file acquisition portion 131 transmits, to the update management portion 132, also an update file to be transmitted to an update portion incapable of communicating with the update management portion 132.

Similar to the first embodiment, the file acquisition portion 131 according to the present embodiment transmits a communication situation request to the update management portion 132. The update management portion 132 receives the communication situation request from the file acquisition portion 131 and transmits a search signal to each update portion. Based on a response signal, the update management portion 132 determines whether the update management portion 132 can communicate with each update portion. Then, the update management portion 132 transmits the determination result to the file acquisition portion 131.

The file acquisition portion 131 transfers update files for all virtual machines targeted at the update to the update management portion 132. According to the example in FIG. 1, the file acquisition portion 131 transfers, to the update management portion 132, the update files including an update file for the update portion 161 incapable of communication to update the software of the third virtual machine 160.

The acceptance portion 137 of the update management portion 132 accepts the update file group transferred from the file acquisition portion 131. As above, the acceptance portion 137 accepts the update files that are used to update the software of all virtual machines to be updated and include update files to update the software for all of the first virtual machine 130 through the fourth virtual machine 230.

The parsing portion 138 parses the update file group contained in the file accepted by the acceptance portion 137 into update files corresponding to the virtual machines. The parsed update files are stored in the real storage 120.

The update instruction portion 139 instructs the update portion to update the software of the virtual machine under the condition that the communication availability determination portion 135 determines the update portion to be capable of communication. Also according to the present embodiment, the update instruction portion 139 issues the update instruction to the update portion 133, the update portion 151, and the update portion 231 except for the update portion 161.

The distribution portion 140 distributes the update file split by the parsing portion 138 to the update portion the communication availability determination portion 135 determines to be capable of communication. Also according to the present embodiment, the distribution portion 140 distributes the update file to the update portion 151 and the update portion 231.

The update management portion 132 receives an update completion notification from each update portion and then transmits an update completion notification, indicating the completion of the update, to the file acquisition portion 131.

As above, the file acquisition portion 131 receives the determination result indicating that the update portion 161 cannot communicate with the update management portion 132. Therefore, it is possible to avoid the determination that an error occurred on the entire update process in the electronic control system 1 even if the update completion notification does not contain information indicating the completion of the update on the virtual machine 160 including the update portion 161.

According to the present embodiment, the update file group transferred from the file acquisition portion 131 may contain an update file to update the third virtual machine 160. This update file is not transmitted from the distribution portion 140. However, in the future, a communication may be restored between the update management portion 132 and the update portion 161 currently incapable of communication. At this time, the update management portion 132 can transmit the update file stored in the real storage 120 to the update portion 161 without requesting the file acquisition portion 131 to transmit an update file to update the software of the third virtual machine 160.

3. Third Embodiment

A failed communication between the update management portion 132 and the update portion 161 disables the software of the virtual machine 160 including the update portion 161 from being updated to the latest version. This is unfavorable from a security and safety standpoint. When there is an update portion that cannot communicate with the update management portion 132, an attempt is made to restore the communication by restarting the virtual machine including the update portion or a vehicle equipped with the electronic control unit.

(1) Update Management Portion 132

Figure 6:
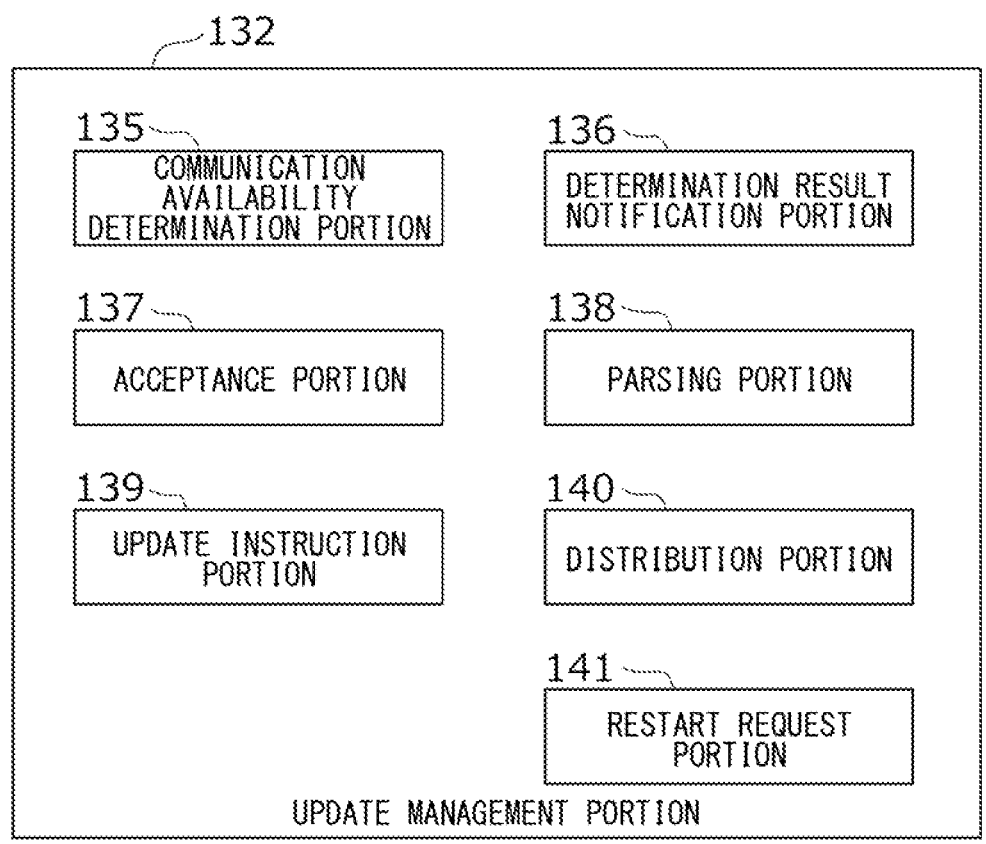
FIG. 6 is a diagram illustrating functions of the update management portion according to the third embodiment.

FIG. 6 illustrates the update management portion 132 according to the present embodiment. The update management portion 132 includes a restart request unit 141 in addition to the functions of the update management portion 132 illustrated in FIG. 2.

Suppose the communication availability determination portion 135 determines a failed communication between the update management portion 132 and the update portion 161. Then, the restart request portion 141 requests a vehicle user to restart the vehicle. The restart request may be notified visually or audibly. For example, the visual notification may be provided by displaying the restart request on the screen of a navigation device mounted on the vehicle. The vehicle restart request may be provided as a request to turn on or off the vehicle power supplies such as ACC, IG, and +B.

Alternatively, the restart request portion 141 may request to restart the virtual machine including an update portion determined to be incapable of communicating with the update management portion 132. According to the example of FIG. 1, the restart request portion 141 requests to restart the third virtual machine 160. The entire vehicle need not be restarted to restart the virtual machine. To notify the restart request for a virtual machine, the restart request portion 141 may issue a notification of the restart request to the hypervisor that manages the virtual machine.

The restart request portion 141 may notify a restart request when a predetermined condition is satisfied. For example, a restart request is notified when there exist at least a specified number of update portions incapable of communicating with the update management portion 132, or when it is impossible to communicate with an update portion to update the software whose update deadline expires within a specified period. Alternatively, the restart request portion 141 may notify a restart request when it is impossible to communicate with an update portion to update the software feature that is highly likely to affect the safe traveling of the vehicle.

Even if the restart request portion 141 notifies a restart request, the restart may be possible depending on situations of the vehicle or the virtual machine, or rather, it may be favorable to keep the vehicle or the virtual machine active. Therefore, it is optional to restart the vehicle or the virtual machine.

(2) Operations of the Update Management Portion 132

Figure 7:
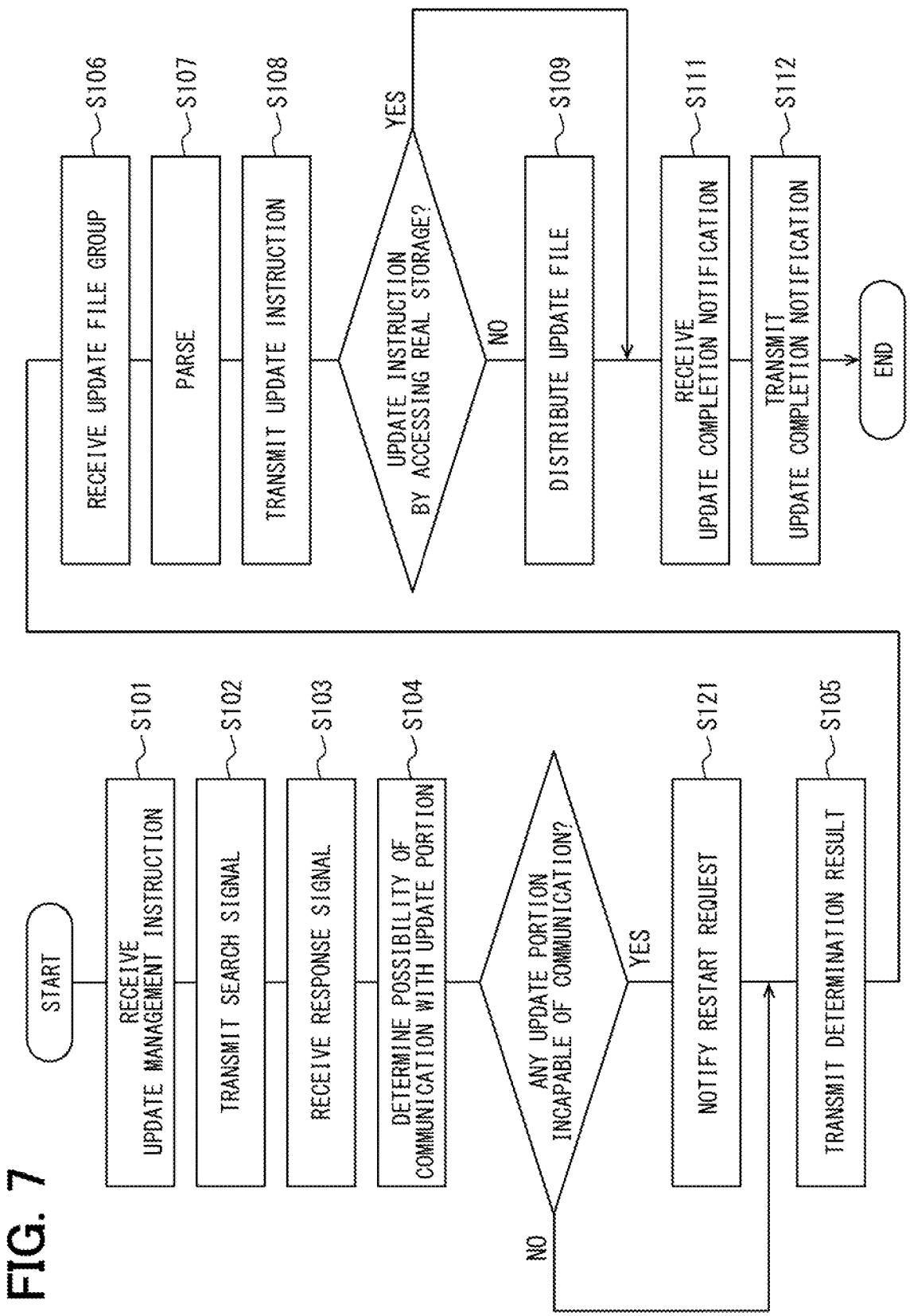
FIG. 7 is a diagram illustrating operations of the update management portion according to the third embodiment.

FIG. 7 illustrates operations of the update management portion 132 according to the present embodiment. Reference numerals equal to those in FIG. 4 signify the same processes as those in FIG. 4, and a description is omitted for brevity.

At S104, the update management portion 132 determines whether communication with each update portion is possible. If it is determined that there is an update portion incapable of communication, the restart request portion 141 notifies a request to restart the vehicle or the virtual machine including the update portion incapable of communication (S121).

(3) Interim Overview

When there is an update portion that cannot communicate with the update management portion 132, the present embodiment can restore the communication by notifying a request to restart the vehicle equipped with the ECU 10 or the virtual machine including the update portion.

(4) Modification of the Third Embodiment

The present modification describes an example using the communication availability determination portion 135 described in the second modification of the first embodiment, as a predetermined condition explained in the third embodiment, As described in the second modification of the first embodiment, the communication availability determination portion 135 determines whether software updates are "associated" among virtual machines. According to the present modification, the communication availability determination portion 135 determines whether the software updates are "associated" among the third virtual machine 160 (comparable to "second virtual machine") determined to be incapable of communication, the second virtual machine 150 (comparable to "third virtual machine"), and the fourth virtual machine 230 (comparable to "third virtual machine")

In the example of FIG. 1, suppose it is determined that the software updates are associated between the third virtual machine 160 and the fourth virtual machine 230. Suppose it is determined that the software updates are not associated between the third virtual machine 160 and the second virtual machine 150.

The communication availability determination portion 135 may determine that communication is impossible between the update management portion 132 and the update portion 161 of the third virtual machine 160. In addition, the communication availability determination portion 135 may determine that the software updates are associated between the third virtual machine 160 and the fourth virtual machine 230. In this case, the restart request portion 141 notifies a request to restart the third virtual machine 160 and the fourth virtual machine 230.

The communication availability determination portion 135 may determine that the communication is impossible between update management portion 132 and the update portion 161 of the third virtual machine 160. In addition, the communication availability determination portion 135 may determine that the software updates are not associated between the third virtual machine 160 and the second virtual machine 150. In this case, the restart request portion 141 notifies a request to restart the third virtual machine 160 and does not notify a request to restart the second virtual machine 150.

When the software updates are determined to be associated between the third virtual machine 160 and the fourth virtual machine 230, the electronic control unit including the third virtual machine 160 may differ from the electronic control unit including the fourth virtual machine 230. In this case, the restart request portion 141 may notify a request to restart the vehicle. According to the example of FIG. 1, the ECU 10 includes the third virtual machine 160. The ECU 2 includes the fourth virtual machine 230 and differs from the ECU 10. Then, the restart request portion 141 notifies a request to restart the vehicle. In this case, it is favorable to add another condition that the vehicle is stopped or parked.

The present modification defines a target for the restart request based on whether software updates are associated. It is possible to restart the target within the necessary and sufficient range for stable operation.

The range for notifying the restart request may be determined based on the identicalness of a hypervisor where the virtual machine is built, instead of the association between the software updates. In the example of FIG. 1, suppose a communication with the update portion 161 of the third virtual machine 160 is determined to be impossible and it is possible to communicate with the update portion 151 of the second virtual machine 150 built on the same hypervisor HV 110. In this case, the restart request portion 141 may notify a request to restart the third virtual machine 160. By comparison, suppose a communication with the update portion 161 of the third virtual machine 160 is determined to be impossible and it is impossible to communicate with the update portion 151 of the second virtual machine 150 built on the same hypervisor HV 110. In this case, the restart request portion 141 may notify a request to restart all virtual machines built on the same hypervisor HV 110.

The operations described in the first embodiment are performed again after the restart based on the restart request. In this case, the restart operation may be performed concurrently with the software update for virtual machines without need for the restart.

4. Modification of the Electronic Control Unit and the Electronic Control System The description below explains a modified configuration of the electronic control unit and the electronic control system common to the first through third embodiments.

Figure 8:
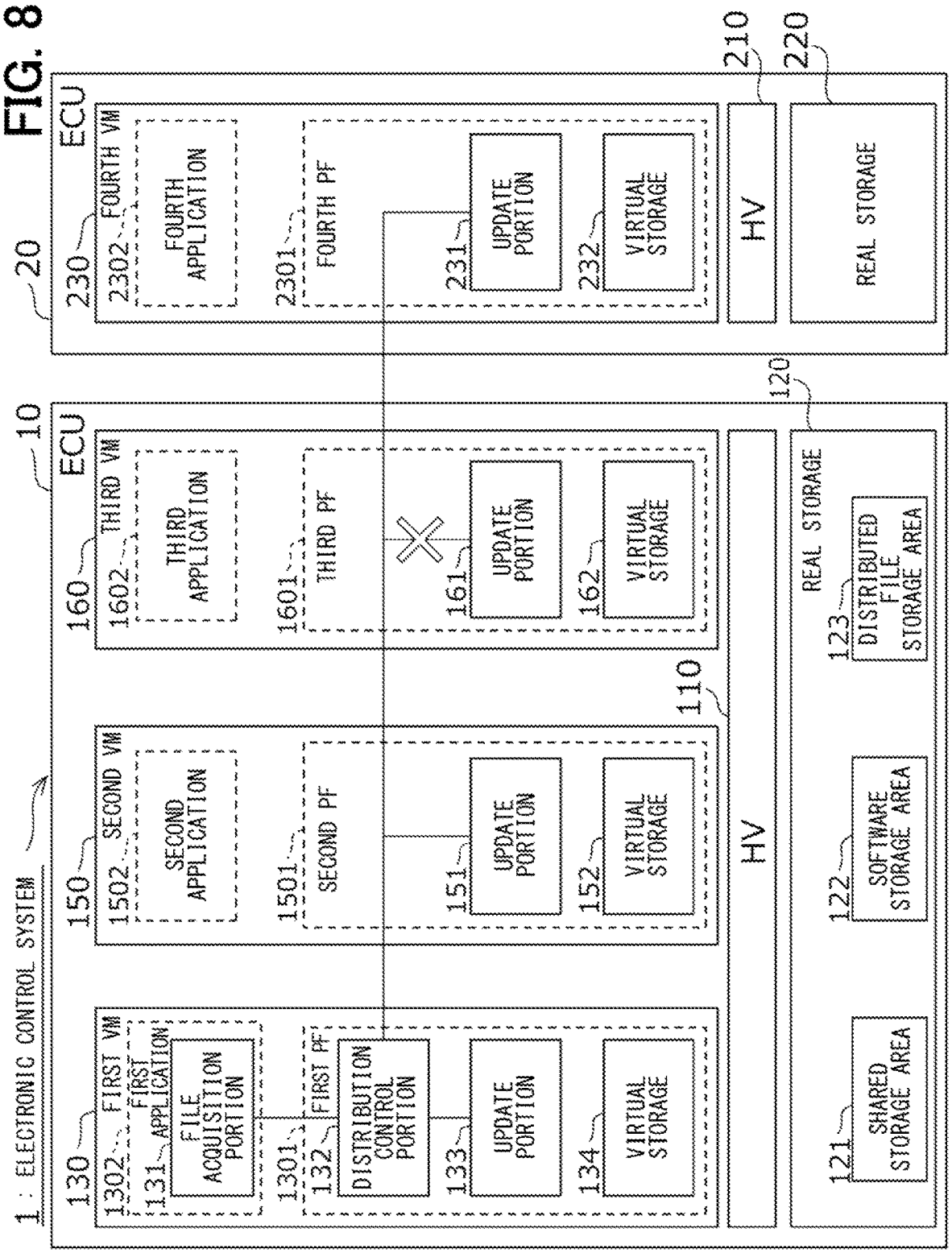
FIG. 8 is a diagram illustrating a modification of the electronic control unit according to the first through third embodiments and the electronic control system including the electronic control unit.

In the above-mentioned example, the ECU 10 is AP-based and the ECU 20 is CP-based. However, each virtual machine built in the ECU may use AP and CP platforms. FIG. 8 is a diagram illustrating each virtual machine using a specific platform (PF)

According to FIG. 8, the first virtual machine 130 includes a first PF 1301. The second virtual machine 150 includes a second PF 1501. The third virtual machine 160 includes a third PF 1601. The fourth virtual machine 230 includes a fourth PF 2301. FIG. 8 also illustrates applications (1302, 1502, 1602, 2302) running on the PF of each virtual machine.

In addition to AP and CP, various types of PFs are available as the first through fourth PFs (1301, 1501, 1601, 2301) that can be used as needed. For example, the first PF 1301 may use AR The second PF 1501 may use CP. The third PF 1601 may use PF other than AP and CP. One ECU may include multiple virtual machines using different PFs. The single ECU can integrate multiple functions by mixing multiple virtual machines using different PFs in one ECU. Consequently, it is possible to reduce the total number of ECUs.

According to this configuration, the OS of the virtual machine may be provided between the hypervisor and the PF, integrated with the hypervisor, or included in the PF, for example.

The update portion of each virtual machine updates the software of the virtual machine. According to the configuration illustrated in FIG. 8, however, the update portion may update the PF or the application running on the PF as a software update for the virtual machine. For example, the update portion 133 updates the first PF 1301 or the first application 1302.

As illustrated in FIG. 8, the file acquisition portion 131 is included in the first application 1302. The update management portion 132 and update portion 133 are included in the first PF 1301. However, the software contained in the first PF 1301 may implement all or part of the functions of the file acquisition portion 131. Alternatively, the first application 1302 may implement all or part of the functions of the update management portion 132 and the update portion 133. Similarly, the second through fourth applications (1502, 1602, 2302) may implement all or part of the functions of the update portions (151, 161, 231).

FIG. 8 further illustrates the configuration where the real storage 120 of the ECU 10 includes three storage areas such as a shared storage area 121, a software storage area 122, and a distributed file storage area 123.

The shared storage area 121 stores update files that are acquired by the file acquisition portion 131 and are parsed by the parsing portion 138 of the update portion 133. The software storage area 122 stores the software configuring the virtual machines, namely, the first through third PFs 1301, 1501, and 1601, and the first through third applications 1302, 1502, and 1602. The distributed file storage area 123 stores update files distributed from the distribution portion 140. The distributed file storage area 123 is virtualized to build virtual storages for the virtual machines.

According to the present modification, the update portion 133 of the first virtual machine 130 accesses the shared storage area 121 and uses the update file stored in the shared storage area 121 to update the virtual machine software stored in the software storage area 122. Suppose an update portion is instructed to update the virtual machine software by using the update file distributed from the distribution portion 140. Then, the update portion updates the software stored in the software storage area 122 by using the update file that is distributed from the distribution portion 140 and is stored in the distributed file storage area 123.

Although not shown in FIG. 8, the real storage 220 of the ECU 20 may include a software storage area and a distributed file storage area, similar to the real storage 120. However, the ECU 20 does not need to store the update files acquired by the file acquisition portion. The real storage 220 may not need to include a storage area comparable to the shared storage area 121. Like the software storage area 122 and the distributed file storage area 123, the software storage area and the distributed file storage area of the real storage 220 store the software configuring the virtual machines and update files distributed from the distribution portion 140.

FIG. 8 illustrates that the real storage 120 includes all of the shared storage area 121 the software storage area 122, and the distributed file storage area 123. However, the real storage 120 may use different storages. For example, the software storage area 122 according to the present modification is non-volatile memory. However, the shared storage area 121 and the distributed file storage area 123 may be non-volatile memory or volatile memory. Therefore, the shared storage area 121 and the distributed file storage area 123 may be provided for the storage areas of the real storage 120 as volatile memory. The software storage area 122 may be provided for the storage area of the real storage 120 as non-volatile memory.

5. Application to the Domain Architecture

The description below explains an example configuration where the electronic control system 1 according to the embodiments is applied to a domain architecture. The domain architecture classifies multiple ECUs into groups called domains according to the functions roles, or network connections. In addition, each domain is provided with a domain controller ECU (DC-ECU) that manages and controls multiple ECUs belonging to the same domain. The domain architecture can organize and integrate ECUs according to functions and networks, enabling a system composed of many ECUs such as an in-vehicle system to not only facilitate operations of updating ECUs in the future but also suppress the total number of increasing ECUs.

(1) Overview of the Domain Architecture

Figure 9:
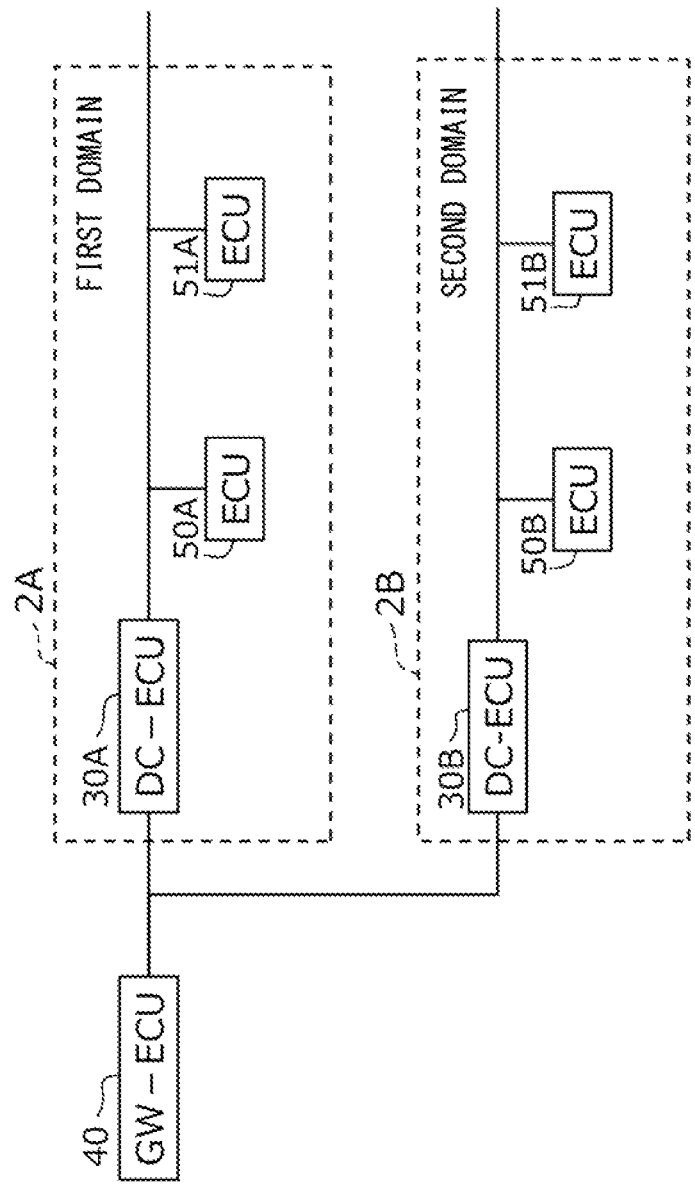
FIG. 9 is a diagram illustrating a domain architecture to which the electronic control system according to the first through third embodiments is applied.

FIG. 9 is a simplified diagram illustrating the domain architecture. The domain architecture illustrated in FIG. 9 includes DC-ECUs 30A and 30B, a gateway ECU (GW-ECU) 40, and ECUs 50A, 51A, 50B and 51B.

The domain architecture illustrated in FIG. 9 includes two domains. A first domain 2A includes DC-ECU 30A and ECUs 50A and 51A. A second domain 2B includes DC-ECU 30B and ECUs 50B and 51B. As above, domains are categorized according to ECU functions and networks. For example, the in-vehicle system includes a domain to control a vehicle drive system, a domain to control automatic operations, and a domain to control entertainment devices such as in-vehicle TVs and in-vehicle computers.

The DC-ECU 30A controls the ECUs 50A and 51A belonging to the first domain 2A. The DC-ECU 30B controls the ECUs 50B and 51B belonging to the second domain 2B. When the first domain 2A controls automatic operations, for example, the DC-ECU 30A controls a camera ECU, a radar ECU, a lidar ECU, a locator ECU, or the ECUs 50A and 51A including various automatic operation applications. The DC-ECU 30A also includes a sensor fusion application that integrates the sensor information output from the ECUs 50A and 51A. Outputs from the sensor fusion application may be supplied to the ECU 50A and 51A.

The GW-ECU 40 functions as a gateway device on the in-vehicle network. The GW-ECU 40 is connected to multiple buses and is connected to other ECUs via each bus. The GW-ECU 40 relays communication between domains, for example. The GW-ECU 40 also functions as a gateway between the outside of the vehicle and the domain.

In FIG. 9, the DC-ECU 30A, the GW-ECU 40, the ECU 50A, and the 51A are illustrated as different ECUs. The above-described ECU functions may be integrated into another ECU. For example, the functions of the ECUs 50A and 51A may be partly integrated into the DC-ECU 30A. In this case, the functions integrated into the DC-ECU 30A may be implemented by the virtual machine mounted on the DC-ECU 30A.

(2) Examples of Applying the Domain Architecture to the Electronic Control System 1

The above-described embodiments have described the electronic control system 1 including the ECU 10 and the ECU 20. When the domain architecture in FIG. 9 is applied to the electronic control system 1, the ECU 10 to acquire the update file is favorably configured as the DC-ECUs 30A and 30B in FIG. 9. In this case, the DC-ECUs 30A and 30B based on the domain architecture each issue the update instructions to the ECUs belonging to the same domain and also distribute the update files as needed. Therefore, the DC-ECUs 30A and 30B do not distribute update instructions or update files to virtual machines of ECUs belonging to different domains.

For example, the ECU 10 configured as the DC-ECU 30A does not distribute update instructions and update files to the ECUs (DC-ECU 30B, ECUs 50B and 51B) included in the second domain 2B. Similarly, the ECU 10 configured as the DC-ECU 30B does not distribute update instructions and update files to ECUs included in the first domain 2A.

As another example, the ECU 10 may be configured as the GW-ECU 40 in FIG. 9. In this case, the ECU 20 is configured as the DC-ECU 30A or 30B or the ECU 50A, 50B, 51A, or 51B.

The electronic control system 1 based on the domain architecture can limit communication between ECUs to the same or related domains. It is possible to suppress the traffic of the entire in-vehicle network and consequently improve the responsiveness in the in-vehicle network.

6. General Overview

There have been described the features of the electronic control unit and the electronic control system including the electronic control unit according to the embodiments of the present disclosure.

The technical terms used in the embodiments are examples and therefore may be replaced with synonymous terms or terms including synonymous functions.

The block diagrams used for the description of the embodiment serve as classification and arrangement of the configuration of the device according to the functions. The block representing each function is implemented by any combination of hardware or software. The block diagram illustrates the functions and therefore can be understood as the disclosure of the invention of the method and the invention of the program implementing the method.

Each embodiment describes the processes, flows, and functional blocks that can be considered as a method. The sequence thereof may be interchanged as long as there does not exist a restriction that forces a certain step to use the result of the preceding step, for example.

In the embodiments and the claims, the terms such as first, second, and so on including Nth (where N is an integer) are used to distinguish the same type of two or more configurations or methods and do not limit the sequence, superiority, or inferiority.

The electronic control unit according to each embodiment is assumed to configure an in-vehicle device mounted on vehicles. However, the electronic control unit according to the present disclosure is applied to any electronic control system unless specifically limited in the claims.

The apparatus according to the present disclosure is exemplified in the following forms.

The form of components includes semiconductor elements, electronic circuits, modules, and microcomputers.

The form of semi-finished products includes electronic control units (ECUs) and system boards.

The form of finished products includes mobile phones, smartphones, tablets, personal computers (PCs), workstations, and servers.

Other examples include devices to support communication functions such as video cameras, still cameras, and car navigation systems.

Each device may additionally include necessary functions such as an antenna and a communication interface.

The present disclosure can be implemented as not only dedicated hardware having the configurations and functions described in each embodiment, but also a combination of a program recorded on a recording medium such as memory or a hard disk to embody the disclosure; and general-purpose hardware including a dedicated or general-purpose CPU and memory capable of executing the program.

A program is stored in a non-transitory tangible storage medium of dedicated or general-purpose hardware as an external storage device such as hard disk, USB memory, or CD/BD or in an internal storage device such as RAM or ROM. The program can be also supplied to dedicated or general-purpose hardware through the use of recording media or via a communication line from a server without the use of recording media. This makes it possible to upgrade the program and always provide the latest features.

The electronic control unit according to the present disclosure has been described as an in-vehicle electronic control unit mainly mounted on automobiles but can apply to all moving bodies such as motorcycles, ships, railroads, and aircraft. The electronic control unit can apply to not only moving bodies but also all products equipped with microcomputers.

What is claimed is:

1. A software update method performed on an electronic control unit including at least one processor and at least one memory storing computer program code that, when executed by the at least one processor, causes the at least one processor to serve as:
　　a first virtual machine;
　　a second virtual machine connected to the first virtual machine;
　　a third virtual machine connected to the first virtual machine;
　　a file acquisition portion that is configured to acquire a file to update software from an outside of the electronic control unit;
　　an update management portion that is configured to manage updates of the software;
　　a first update portion configured to update software of the first virtual machine;
　　a second update portion configured to update software of the second virtual machine; and
　　a third update portion configured to update software of the third virtual machine;

the method comprising:
accepting the file from the file acquisition portion;
instructing the first update portion, in response to, communication between the first update portion and the update management portion being established, to perform a software update using the file accepted from the file acquisition portion;
instructing the second update portion, in response to communication between the second update portion and the update management portion being established, to perform a software update using the file accepted from the file acquisition portion;
transmitting, with the at least one processor executing the computer program code to serve as the update management portion, a search signal at a predetermined timing to each of the first and second update portions;
transmitting, with the at least one processor executing the computer program code to serve as the first update portion, a response signal to the update management portion if the first update portion receives the search signal from the update management portion;
transmitting, with the at least one processor executing the computer program code to serve as the second update portion, a response signal to the update management portion if the second update portion receives the search signal from the update management portion;
instructing the first update portion to perform the software update if the update management portion receives the response signal from the first update portion;
instructing the second update portion to perform the software update if the update management portion receives the response signal from the second update portion; and
not instructing the second update portion and the third update portion to perform a software update using the accepted file, even if the communication between the update management portion and the third update portion is established, in response to the communication between the update management portion and the second update portion not being established and in response to the software update for the second virtual machine being associated with the software update for the third virtual machine.

2. The software update method according to claim 1, further comprising:
distributing, with the at least one processor executing the computer program code to serve as a distribution portion, the file to the second update portion that is establishing communication.

3. The software update method according to claim 2, further comprising:
splitting, with the at least one processor executing the computer program code to serve as a parsing portion, the accepted file, and
distributing, with the at least one processor executing the computer program code to serve as the distribution portion, the file split by the parsing portion to the second update portion that is establishing communication.

4. The software update method according to claim 1, wherein
the electronic control unit is mounted in a moving body.

5. The software update method according to claim 1, further comprising:
making, with the at least one processor executing the computer program code to serve as a restart request portion, a notification of a request to restart a vehicle equipped with the electronic control unit or the second virtual machine in response to communication with the second update portion not being established.

6. The software update method according to claim 5, further comprising:
making, with the at least one processor executing the computer program code to serve as the restart request portion, a notification of a request to restart the second virtual machine and the third virtual machine in response to communication with the second update portion not being established and in response to a software update for the second virtual machine being associated with a software update for the third virtual machine.

7. The software update method according to claim 1, wherein the transmitting the search signal to each of the first and second update portions is performed in response to receiving a communication situation request from the file acquisition portion.

8. The electronic control unit according to claim 1, wherein the transmitting the search signal to each of the first and second update portions is performed periodically.

9. The electronic control unit according to claim 1, wherein the transmitting the search signal to each of the first and second update portions is performed at the predetermined timing when the electronic control unit boots up.

10. A non-transitory, computer readable, tangible storage medium storing a software update program executable on an electronic control unit including at least one processor, the software update program, when executed by the at least one processor, causing the at least one processor to serve as:
a first virtual machine;
a second virtual machine connected to the first virtual machine;
a third virtual machine connected to the first virtual machine;
a file acquisition portion that is configured to acquire a file to update software from an outside of the electronic control unit;
an update management portion that is configured to manage updates of the software;
a first update portion configured to update software of the first virtual machine;
a second update portion configured to update software of the second virtual machine; and
a third update portion configured to update software of the third virtual machine;
the software update program, when executed by the at least one processor, causing the at least one processor to perform:
accepting the file from the file acquisition portion;
instructing one or more of the first update portion, in response to communication between the first update portion and the update management portion being established, to perform a software update using the file accepted from the file acquisition portion;
instructing the second update portion, in response to communication between the second update portion and the update management portion being established, to perform a software update using the file accepted from the file acquisition portion;
transmitting, with the at least one processor executing the software update program to serve as the update management portion, a search signal at a predetermined timing to each of the first and second update portions;
transmitting, with the at least one processor executing the software update program to serve as the first update portion, a response signal to the update management portion if the first update portion receives the search signal from the update management portion;

transmitting, with the at least one processor executing the software update program to serve as the second update portion, a response signal to the update management portion if the second update portion receives the search signal from the update management portion;

instructing the first update portion to perform the software update if the update management portion receives the response signal from the first update portion;

instructing the second update portion to perform the software update if the update management portion receives the response signal from the second update portion; and not instructing the second update portion and the third update portion to perform a software update using the accepted file, even if the communication between the update management portion and the third update portion is established, in response to the communication between the update management portion and the second update portion being not established and that in response to the software update for the second virtual machine being associated with the software update for the third virtual machine.

11. A method performed by a first electronic control unit having at least one first processor and at least one first memory storing first computer program code that, when executed by the at least one first processor, causes the at least one first processor to serve as a first virtual machine and a first update portion configured to update software of the first virtual machine;

a second electronic control unit having at least one second processor and at least one second memory storing second computer program code that, when executed by the at least one second processor, causes the at least one second processor to serve as a second virtual machine and a second update portion configured to update software of the second virtual machine connected to the first virtual machine; and a third electronic control unit have at least one third processor and at least one third memory storing third computer program code that, when executed by the at least one third processor, causes the at least one third processor to serve as a third virtual machine and a third update portion configured to update software of the third virtual machine connected to the first virtual machine;

the first computer program code, when executed by the at least one first processor, further configures the first virtual machine to serve as a file acquisition portion that is configured to acquire a file to update software from an outside of the first electronic control unit; and an update management portion that is configured to manage updates of the software;

the first computer program code, when executed by the at least one first processor, further configures the first virtual machine, as the update management portion, to serve as:

an acceptance portion that is configured to accept the file from the file acquisition portion; and an update instruction portion that is configured to instruct the second update portion, in response to communication between the second update portion and the update management portion being established, to perform a software update using the file accepted by the acceptance portion; and the method comprising:

transmitting, with the at least one first processor executing the first computer program code as the update management portion, a search signal at a predetermined timing to the second update portion;

transmitting, with the at least one second processor executing the second computer program code as the second update portion, a response signal to the update management portion if the second update portion receives the search signal from the update management portion;

instructing, with the at least one first processor executing the first computer program code as the update management portion, the first update portion to perform the software update if the update management portion receives the response signal from the second update portion;

not instructing, with the at least one first processor executing the first computer program code as the update instruction portion, not to instruct the second update portion and the third update portion to perform a software update using the file accepted by the acceptance portion, even if the communication between the update management portion and the third update portion is determined to be established, in response to the communication between the update management portion and the second update portion not being established and in response to the software update for the second virtual machine being associated with the software update for the third virtual machine.

* * * * *